United States Patent [19]
von Taschitzki

[11] Patent Number: 5,482,006
[45] Date of Patent: Jan. 9, 1996

[54] AUTOMATIC FEEDING DEVICE FOR SUPPLYING DOMESTIC ANIMALS

[75] Inventor: Rainer von Taschitzki, Cologne, Germany

[73] Assignee: Aratowerk Walter von Taschitzki GmbH & Co. KG, Germany

[21] Appl. No.: 267,223

[22] Filed: Jul. 5, 1994

[30] Foreign Application Priority Data

Jul. 2, 1993 [DE] Germany ............... 43 22 004.5

[51] Int. Cl.⁶ .................................................. A01K 5/00
[52] U.S. Cl. .................................................. 119/54
[58] Field of Search .............. 119/54, 53.5, 56.1, 119/70, 72.5; 222/322, 504, 404, 226, 243, 245, 246

[56] References Cited

U.S. PATENT DOCUMENTS

| | | |
|---|---|---|
| 1,334,075 | 3/1920 | Borton . |
| 1,343,817 | 6/1920 | Gilbert . |
| 1,788,092 | 1/1931 | Fink ............................ 119/54 |
| 2,640,464 | 6/1953 | Jindrich ........................ 119/54 |
| 2,939,424 | 6/1960 | Frederiksen ................ 119/72.5 |
| 4,320,891 | 3/1982 | Cairns ........................ 119/72.5 |
| 4,355,598 | 10/1982 | Saylor ......................... 119/54 |
| 4,790,266 | 12/1988 | Kleinsasser et al. ......... 119/54 |
| 5,146,872 | 9/1992 | Waldner . |

FOREIGN PATENT DOCUMENTS

| | | |
|---|---|---|
| 0453636 | 10/1991 | European Pat. Off. . |
| 2683427 | 5/1993 | France ......................... 119/54 |
| 126238 | 12/1901 | Germany . |
| 2913511 | 10/1980 | Germany ...................... 119/54 |
| 3821149 | 12/1989 | Germany ...................... 119/54 |
| 3919957 | 12/1990 | Germany . |
| 3937602 | 5/1991 | Germany . |
| 82204 | 7/1956 | Netherlands . |
| 329278 | 6/1958 | Switzerland ................ 119/53.5 |

*Primary Examiner*—Todd E. Manahan
*Attorney, Agent, or Firm*—Diller, Ramik & Wight

[57] ABSTRACT

The invention relates to an automatic feeding device (1) for supplying domestic animals, particularly fattening pigs, which dispenses bulk feed of varying flowability, where a feed bin (8) is provided above a feed trough (6), the base (9) of this bin (8) possessing a removal aperture, below which a feed plate (10) is located in such a way that a horizontal feed removal slit (11) is formed between the edge of the removal aperture of the feed bin (8) and the feed plate (10). So that the animal searching for food can act directly and with maximum force on the sticking supply of feed, a tool (12), hung loosely into the bin (8), is provided, which possesses at least one actuating element (7) projecting from the bin (8) through the feed removal slit (11) towards the animal in such a way that it can be moved back and forth by the animal and is guided in the feed removal slit (13).

20 Claims, 2 Drawing Sheets

AUTOMATIC FEEDING DEVICE FOR SUPPLYING DOMESTIC ANIMALS

BACK GROUND OF THE INVENTION

The invention relates to an automatic feeding device for supplying domestic animals, particularly fattening pigs, which dispenses bulk feed of varying flowability, where a feed bin is provided above a feed trough, the base of this bin possessing a removal aperture, below which a feed plate is located in such a way that a horizontal feed removal slit is formed between the edge of the removal aperture of the feed bin and the feed plate. In this context, the feed plate prevents the entire feed from trickling out of the feed bin, on the one hand, while the feed removal slit releases a certain amount of the feed for removal, on the other.

As it can happen, in the case of feed mixes with poor flowability, that the feed located in the bin ceases to flow, with the result that the animals looking for food find nothing on the feed plate, it is desirable to integrate a device in the bin which is capable of loosening the stuck feed and improving its flowability.

In automatic feeding devices provided with a removal device to be operated by the animal, such as the device described in DE 39 37 602 A 1, for example, elements for loosening the feed supply are known which, being connected to said feed removal device, are intended to transmit its movements to the feed supply. However, such designs have the disadvantage that the force exerted by the animal does not achieve the desired success, despite maximum effort, because it can only be transmitted to the loosening element indirectly via the removal device and particularly because the animal can only use the tip of its snout for this purpose. Thus, devices of this kind can even have a negative effect in that the loosening elements, which can only be operated indirectly via the feed removal device, obstruct feed removal more than they promote it.

SUMMARY OF THE INVENTION

Consequently, the task of the invention is to create an automatic feeding device of the kind mentioned at the start which guarantees more effective loosening of the feed, induced by the animal, in the event that the supply of feed comes to a stop.

In accordance with the invention, this task is solved by providing an automatic feeding device of the kind mentioned at the start with a tool, hung loosely into the bin, for the feeding animal to loosen the supply of feed, said tool having at least one actuating element projecting from the bin through the feed removal slit towards the animal in such a way that it can be moved back and forth by the animal and is guided in the feed removal slit.

On the basis of this solution, the animal in search of food is provided with a tool with which it can act on the sticking supply of feed directly and with maximum force.

In a preferred improvement of the subject of the application, an actuating organ is located on each of the actuating elements projecting towards the animal.

These actuating organs can be of roughly oval design. This allows the animal to grip it tight with its entire mouth. The animal thus has an extremely effective tool at its disposal for the purpose of obtaining a further portion of feed by acting directly on the sticking supply of feed.

The actuating organs can expediently be fitted to the actuating elements in detachable form. Specifically, fastening can be achieved by means of screw-fitting elements.

The tool to be actuated by the animal is preferably designed in one piece and can have a simple shape. For preference, the tool has the shape of a stirrup, the two ends of which project through the feed removal slit towards the animal and form the actuating elements. Roughly oval actuating organs can then be fixed to the ends of the stirrup in detachable fashion, using screw-fitting elements or similar.

The subject of the application is described in more detail below on the basis of the practical example presented in the figures.

DESCRIPTION OF THE PREFERRED EMBODIMENT

Figure 1:
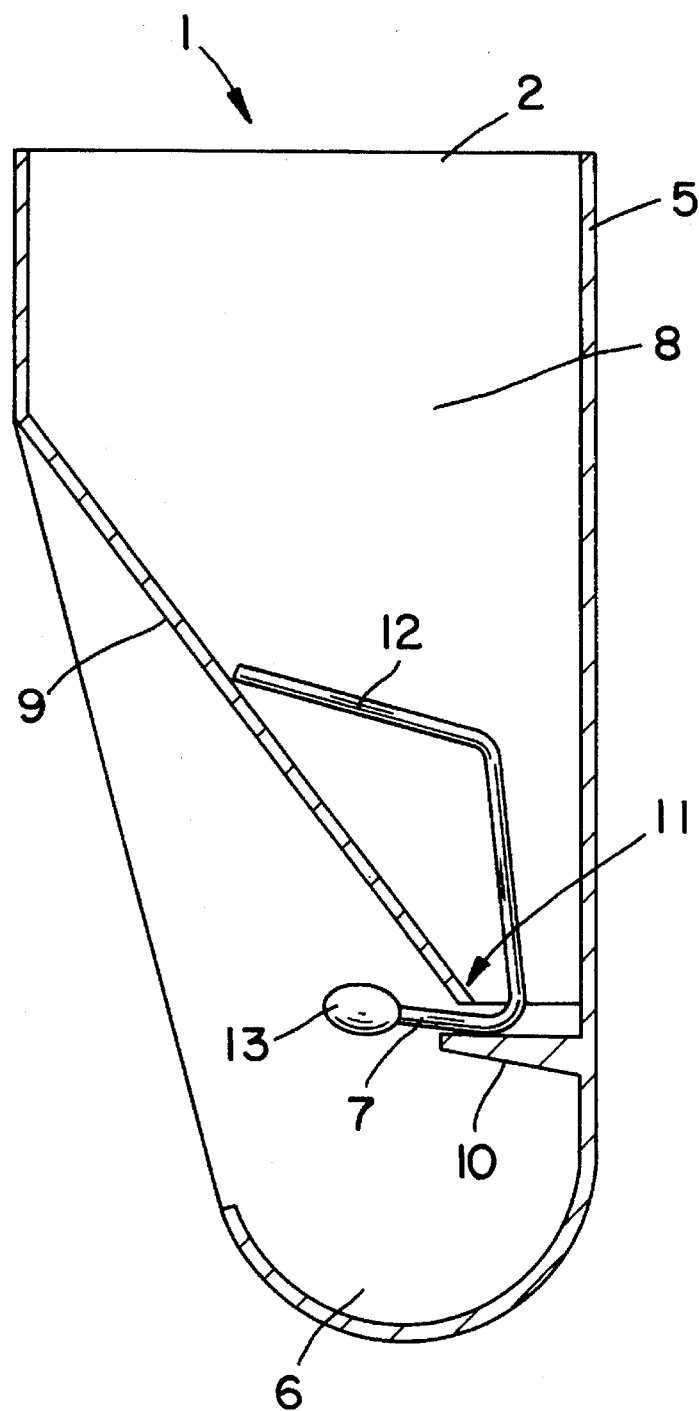
FIG. 1 shows a schematic diagram of a practical example of the feeding device in the form of an elevation and a longitudinal section
Figure 2:
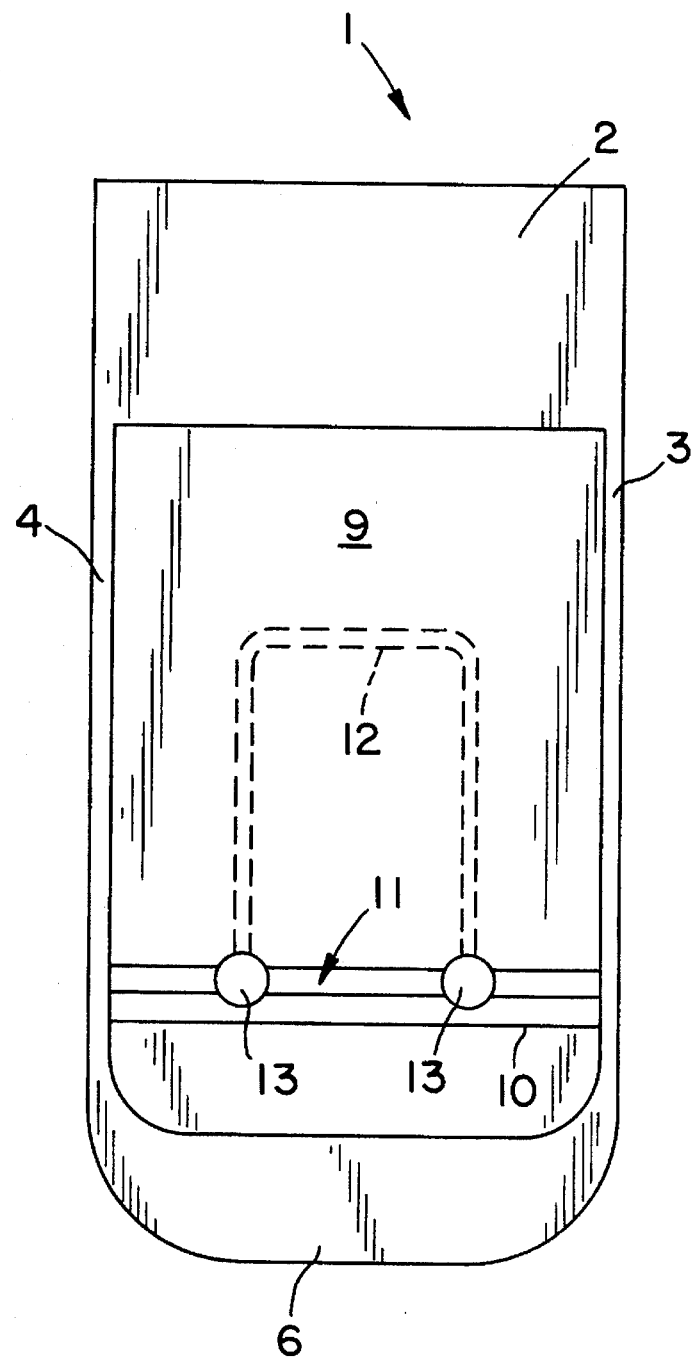
FIG. 2 shows a section along Line II—II in FIG. 1.

The automatic feeding device 1 for supplying domestic animals, particularly fattening pigs, comprises a housing 2, in which a feeding trough 6 is formed in the lower section by the converging ends of side walls 3 and 4 and the rear wall 5, while the upper section forms a feed bin 8 between the side walls 3 and 4, the rear wall 5 and the front wall, the receding part of which forms the base 9 of feed bin 8.

The downward-sloping base 9 of feed bin 8 does not make contact with the rear wall 5, meaning that a removal slit 11 is formed between the bottom edge of the base 9 and the feed plate 10 located below it, in which slit an actuating element 7 of a tool 12 integrated in the feed bin 8 is guided back and forth during movement induced by the animal. In this context, the tool 12 can both be slid longitudinally along the feed removal slit by the animal or tilted perpendicular to the slit, this resulting in movement which is possible in all three dimensions and loosens the feed.

The tool 12 is designed in the form of a simple stirrup, the two ends of which project through the feed removal slit 11, towards the animal, and form two actuating elements 7. The actuating elements 7 are each provided with an actuating organ 13, which is roughly oval in shape and is fitted to the associated actuating element 7 in detachable fashion.

If the supply of feed in feed bin 8 comes to a stop and no more feed flows out of feed removal slit 11, the animal in search of food can, with the aid of actuating organs 13, set tool 12 in motion and thus act directly on the feed supply in order to loosen it in such a way that a new portion of feed is released from removal slit 11.

As this actuation of tool 12 is direct and the animal in search of food can take actuating organ 13 firmly in its mouth, if necessary, it is in the advantageous position of acting on the sticking feed supply with extreme intensity and thus of achieving complete success through its efforts.

Although a preferred embodiment of the invention has been specifically illustrated and described herein, it is to be understood that minor variations may be made in the apparatus without departing from the spirit and scope of the invention, as defined the appended claims.

I claim:

1. An automatic feeding device for dispensing bulk feed of varying flowability to domestic animals comprising a feed bin located substantially above a feed trough, said feed bin having a lower edge defining an outlet, said feed trough having a feed plate below and spaced from said lower edge and defining with said lower edge a generally horizontal feed dispensing slot, tool means for agitating and loosening feed in said feed bin in response to animal actuation, said tool means including a pair of arms resting upon said feed plate and projecting through said dispensing slot into an area proximate said feed trough, said pair of arms being interconnected by an upstanding member extending away from said feed plate into said feed bin, and said pair of arms and upstanding member being otherwise unconnected to said feed trough.

2. The automatic feeding device as defined in claim 1 wherein said upstanding member includes a bight portion.

3. The automatic feeding device as defined in claim 1 including actuating means carried by terminal ends of said pair of arms for contactable actuation by a feeding animal.

4. The automatic feeding device as defined in claim 1 wherein said upstanding member includes a bight portion in contact with a wall of said feed trough.

5. The automatic feeding device as defined in claim 1 wherein said upstanding member includes a bight portion in contact with an upwardly inclined wall of said feed trough.

6. The automatic feeding device as defined in claim 1 wherein said upstanding member includes a pair of upstanding legs each joined to one of said arms, and a bight portion between said legs.

7. The automatic feeding device as defined in claim 6 including actuating means carried by terminal ends of said pair of arms for contactable actuation by a feeding animal.

8. The automatic feeding device as defined in claim 6 including actuating means carried by terminal ends of said pair of arms for contactable actuation by a feeding animal, and said actuatable means is an oval-shaped member carried by each arm.

9. The automatic feeding device as defined in claim 6 including actuating means carried by terminal ends of said pair of arms for contactable actuation by a feeding animal, said actuatable means is an oval-shaped member carried by each arm, and thread means for detachably securing each oval-shaped member to its associated arm.

10. The automatic feeding device as defined in claim 1 wherein said upstanding member includes a pair of upstanding legs each joined to one of said arms, a bight portion between said legs, and said bight portion is in contact with a wall of said feed trough.

11. The automatic feeding device as defined in claim 10 including actuating means carried by terminal ends of said pair of arms for contactable actuation by a feeding animal.

12. The automatic feeding device as defined in claim 10 including actuating means carried by terminal ends of said pair of arms for contactable actuation by a feeding animal, and said actuatable means is an oval-shaped member carried by each arm.

13. The automatic feeding device as defined in claim 10 including actuating means carried by terminal ends of said pair of arms for contactable actuation by a feeding animal, said actuatable means is an oval-shaped member carried by each arm, and thread means for detachably securing each oval-shaped member to its associated arm.

14. The automatic feeding device as defined in claim 1 wherein said upstanding member includes a pair of upstanding legs each joined to one of said arms, a bight portion between said legs, said legs each include first and second leg portion defining an obtuse angle therebetween, said first leg portions are each joined to one of said arms, and said second leg portions are joined together by a bight portion.

15. The automatic feeding device as defined in claim 14 including actuating means carried by terminal ends of said pair of arms for contactable actuation by a feeding animal.

16. The automatic feeding device as defined in claim 14 including actuating means carried by terminal ends of said pair of arms for contactable actuation by a feeding animal, and said actuatable means is an oval-shaped member carried by each arm.

17. The automatic feeding device as defined in claim 1 wherein said upstanding member includes a pair of upstanding legs each joined to one of said arms, a bight portion between said legs, said legs each include first and second leg portion defining an obtuse angle therebetween, said first leg portions are each joined to one of said arms, said second leg portions are joined together by a bight portion, and said bight portion is in contact with a wall of said feed trough.

18. The automatic feeding device as defined in claim 1 including actuating means carried by terminal ends of said pair of arms for contactable actuation by a feeding animal, and said actuatable means is an oval-shaped member carried by each arm.

19. The automatic feeding device as defined in claim 1 including actuating means carried by terminal ends of said pair of arms for contactable actuation by a feeding animal, and said actuatable means is an oval-shaped member detachably carried by each arm.

20. The automatic feeding device as defined in claim 7 including actuating means carried by terminal ends of said pair of arms for contactable actuation by a feeding animal, said actuatable means is an oval-shaped member carried by each arm, and thread means for detachably securing each oval-shaped member to its associated arm.

* * * * *